US008611078B2

(12) United States Patent
Rouvala et al.

(10) Patent No.: US 8,611,078 B2
(45) Date of Patent: Dec. 17, 2013

(54) METHOD AND APPARATUS FOR DISPLAYS

(75) Inventors: Markku Rouvala, Helsinki (FI); Tapani von Rauner, Helsinki (FI); Kimmo-Antero Rantala, Ramona, CA (US)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 12/981,241

(22) Filed: Dec. 29, 2010

(65) Prior Publication Data

US 2012/0170200 A1    Jul. 5, 2012

(51) Int. Cl.
 *G06F 1/16*    (2006.01)
 *H05K 5/00*    (2006.01)
 *H05K 7/00*    (2006.01)

(52) U.S. Cl.
 USPC ............. 361/679.28; 361/679.3; 361/679.56

(58) Field of Classification Search
 USPC ............................ 361/679.21, 679.26–679.3; 455/575.1–575.4
 See application file for complete search history.

(56) References Cited

U.S. PATENT DOCUMENTS

| | | | |
|---|---|---|---|
| 5,170,173 A * | 12/1992 | Krenz et al. | 343/702 |
| 6,272,324 B1 * | 8/2001 | Rudisill et al. | 455/575.8 |
| 6,470,132 B1 | 10/2002 | Nousiainen et al. | |
| 6,628,107 B1 | 9/2003 | Bang et al. | |
| 7,429,984 B2 | 9/2008 | Sweeney | |
| 7,986,523 B2 * | 7/2011 | Chang | 361/679.55 |
| 2002/0052228 A1 * | 5/2002 | Ko | 455/574 |
| 2002/0086698 A1 * | 7/2002 | Sawada et al. | 455/550 |
| 2005/0272462 A1 * | 12/2005 | Okamoto | 455/550.1 |
| 2007/0015531 A1 | 1/2007 | Disalvo | |
| 2010/0087232 A1 * | 4/2010 | Yeh et al. | 455/575.4 |
| 2010/0299873 A1 * | 12/2010 | Song | 16/236 |
| 2011/0122555 A1 * | 5/2011 | Yeh et al. | 361/679.01 |
| 2011/0188176 A1 * | 8/2011 | Kim | 361/679.01 |

FOREIGN PATENT DOCUMENTS

| | | | | |
|---|---|---|---|---|
| EP | 1148406 A2 * | 10/2001 | | G06F 1/00 |
| EP | 2101203 A1 | 9/2009 | | |
| WO | WO 2005069585 A1 * | 7/2005 | | H04M 1/02 |
| WO | 2009/053801 A1 | 4/2009 | | |

* cited by examiner

*Primary Examiner* — Adrian S Wilson
(74) *Attorney, Agent, or Firm* — Nokia Corporation

(57) ABSTRACT

In accordance with an example embodiment of the present invention, an apparatus comprising a first body comprising a first power source, and a second body comprising a second power source and a display, the second body is configured to move relative to the first body between a closed configuration and an open configuration via at least one intermediate configuration, and when the apparatus is in at least one of the open and closed configurations the first power source is configured to power the display, and when the apparatus is in the at least one intermediate configuration the second power source is configured to power the display.

15 Claims, 16 Drawing Sheets

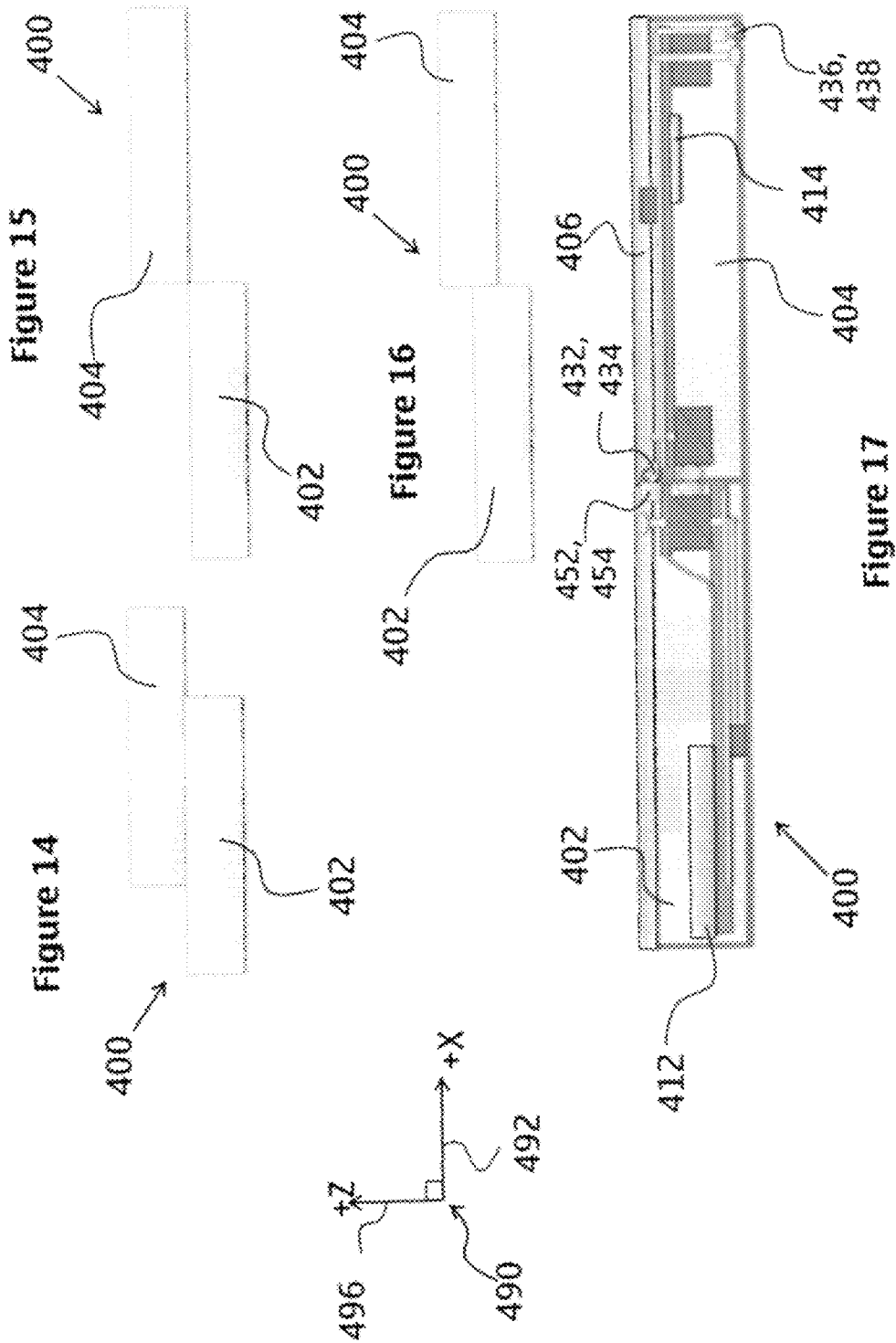

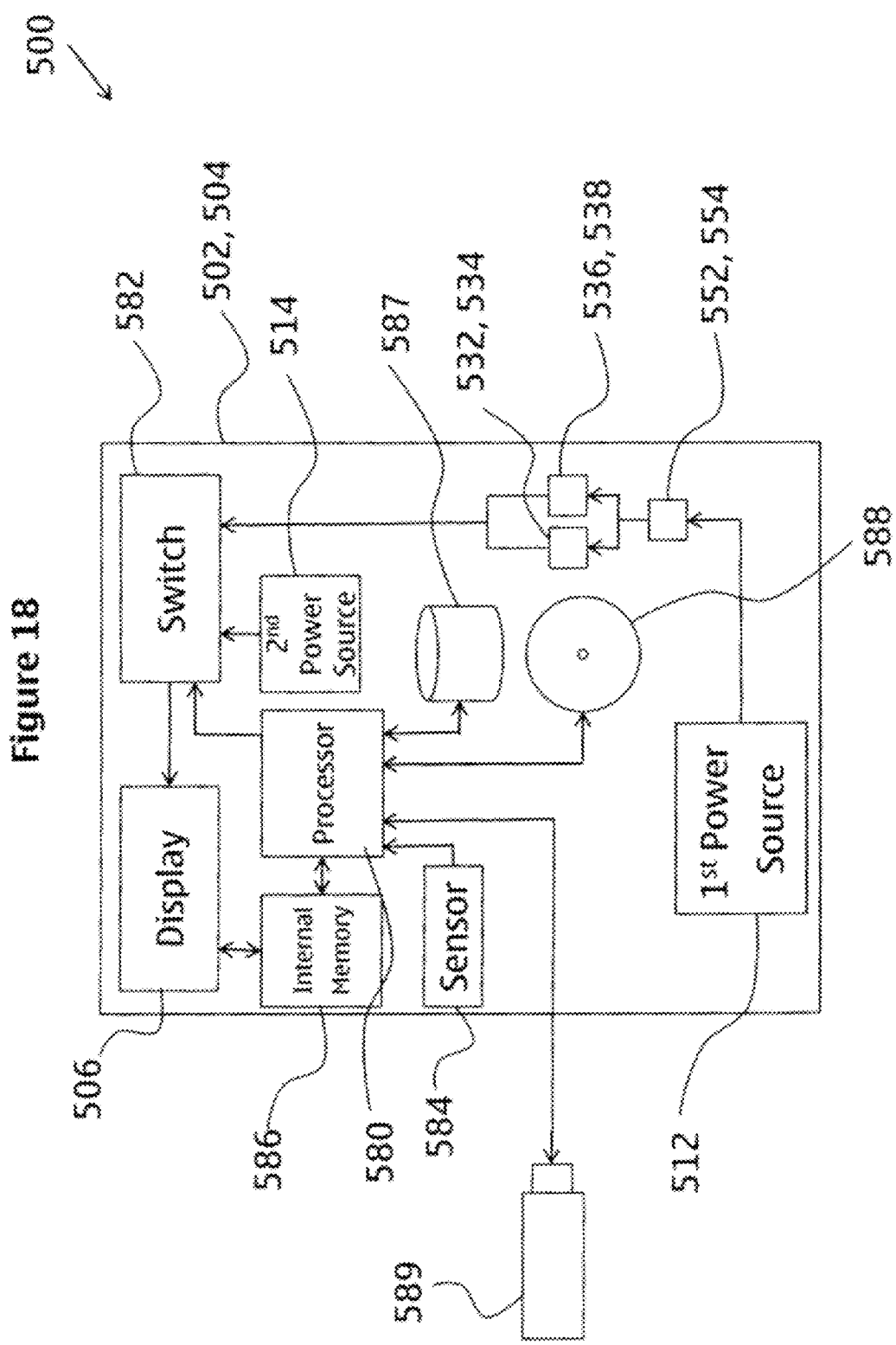

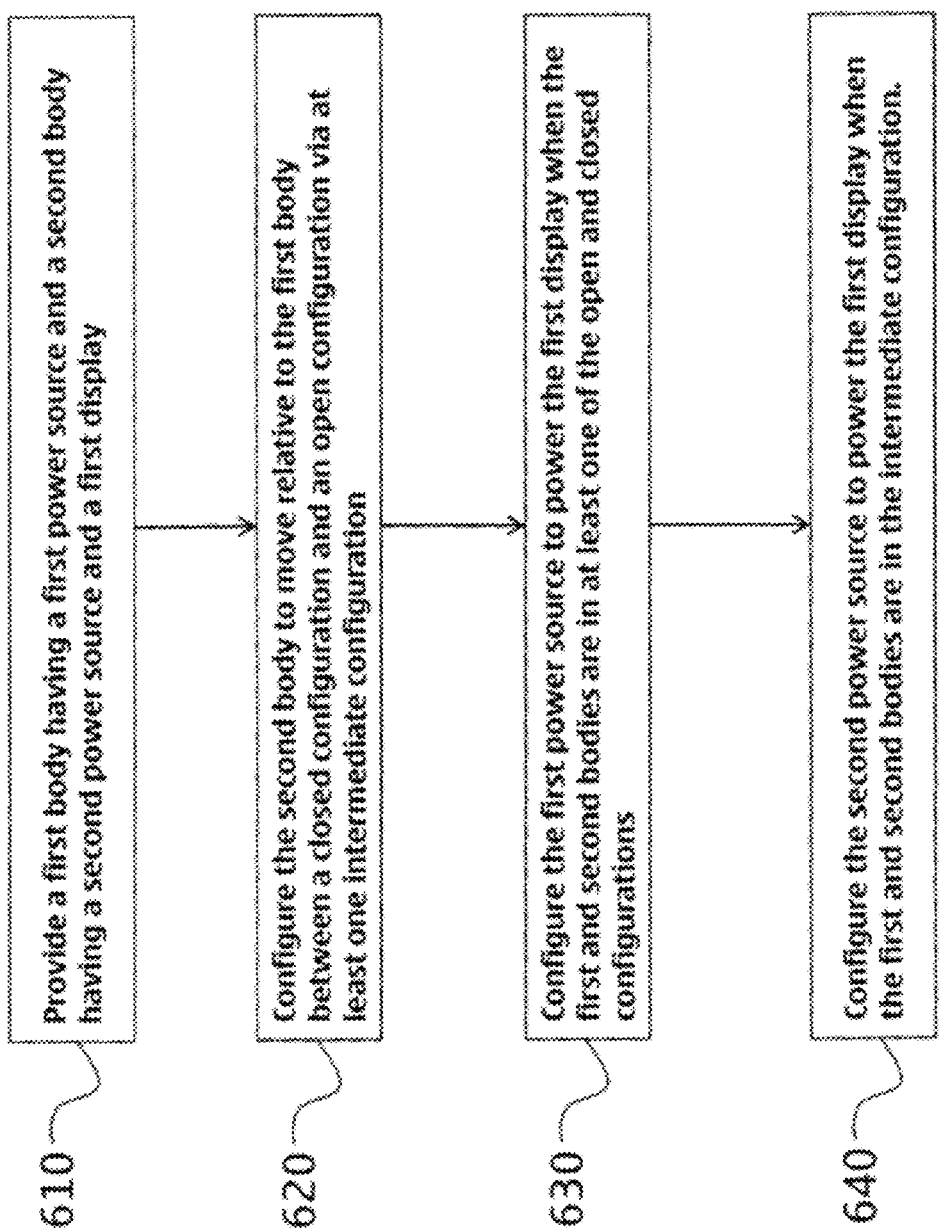

US 8,611,078 B2

METHOD AND APPARATUS FOR DISPLAYS

TECHNICAL FIELD

The present application relates generally to display technology for portable electronic devices.

BACKGROUND

A display for a portable electronic device uses roughly one third of the total energy used in a typical device, compared with other main energy users, for example, radio frequency circuitry (RF), processors (web, multimedia) and stand-by. Power for a display is typically provided by a power source such as a battery, and may, for example, have a supply voltage of 3.6 Volts. The power source may also have local decoupling using standard ceramic capacitors. In portable electronic devices, which have more than one body part, the battery and the display may be in different body parts of the device, for example, clam shell or flip phones, slide phones, and/or the like. When the power source is disposed in one body part of a multi-body device, and the display is disposed in another body part of the device, the power must be provided to the display to keep the device fully functional during use.

SUMMARY

Various aspects of examples of the invention are set out in the claims.

According to a first aspect of the present invention, there is provided an apparatus comprising a first body comprising a first power source, and a second body comprising a second power source and a display, the second body is configured to move relative to the first body between a closed configuration and an open configuration via at least one intermediate configuration, and when the apparatus is in at least one of the open and closed configurations, the first power source is configured to power the display, and when the apparatus is in the at least one intermediate configuration the second power source is configured to power the display.

According to a second aspect of the present invention, there is provided a method comprising: providing a first body having a first power source and a second body having a second power source and a display, configuring the second body to move relative to the first body between a closed configuration and an open configuration via at least one intermediate configuration, and configuring the first power source to power the display when the first and second bodies are in at least one of the open and closed configurations, and configuring the second power source to power the display when the first and second bodies are in the at least one intermediate configuration.

According to a third aspect of the present invention, there is provided an apparatus, comprising at least one processor and at least one memory including computer program code, the at least one memory and the computer program code configured to, with the at least one processor, cause the apparatus to perform at least the following detect the configuration of the apparatus, switch a display between at least one of a first and second power source such that when the apparatus is in at least one of an open and a closed configuration, the first power source is configured to power the display, and when the apparatus is in at least one intermediate configuration the second power source is configured to power the display based on the detected configuration of the apparatus.

BRIEF DESCRIPTION OF THE DRAWINGS

For a more complete understanding of example embodiments of the present invention, reference is now made to the following descriptions taken in connection with the accompanying drawings in which:

FIG. 14 illustrates a side view of an intermediate configuration of an apparatus when the second body initially slides relative to the first body in a first direction according to an embodiment of the invention;

FIG. 15 illustrates a side view of an intermediate configuration of an apparatus when the second body slides relative to the first body in a second direction according to an embodiment of the invention;

FIG. 16 illustrates a side view of another intermediate configuration of an apparatus when the second body slides relative to the first body in a second direction according to an embodiment of the invention;

FIG. 17 illustrates a side view of an open configuration of an apparatus according to an embodiment of the invention;

FIG. 18 illustrates a block diagram of an apparatus according to an embodiment of the invention; and FIG. 19 illustrates a flow diagram of a method according to an embodiment of the invention.

DETAILED DESCRIPTION OF THE DRAWINGS

In embodiments below, the terms 'connect' and 'couple' and their derivatives mean operationally connected or coupled. It should be appreciated that any number or combination of intervening components can exist including no intervening components. Additionally, it should be appreciated that the connection or coupling may be a physical galvanic connection and/or an electromagnetic connection.

According to an example embodiment of the invention its potential advantages are understood by referring to FIGS. 1 through 19.

Figure 1:
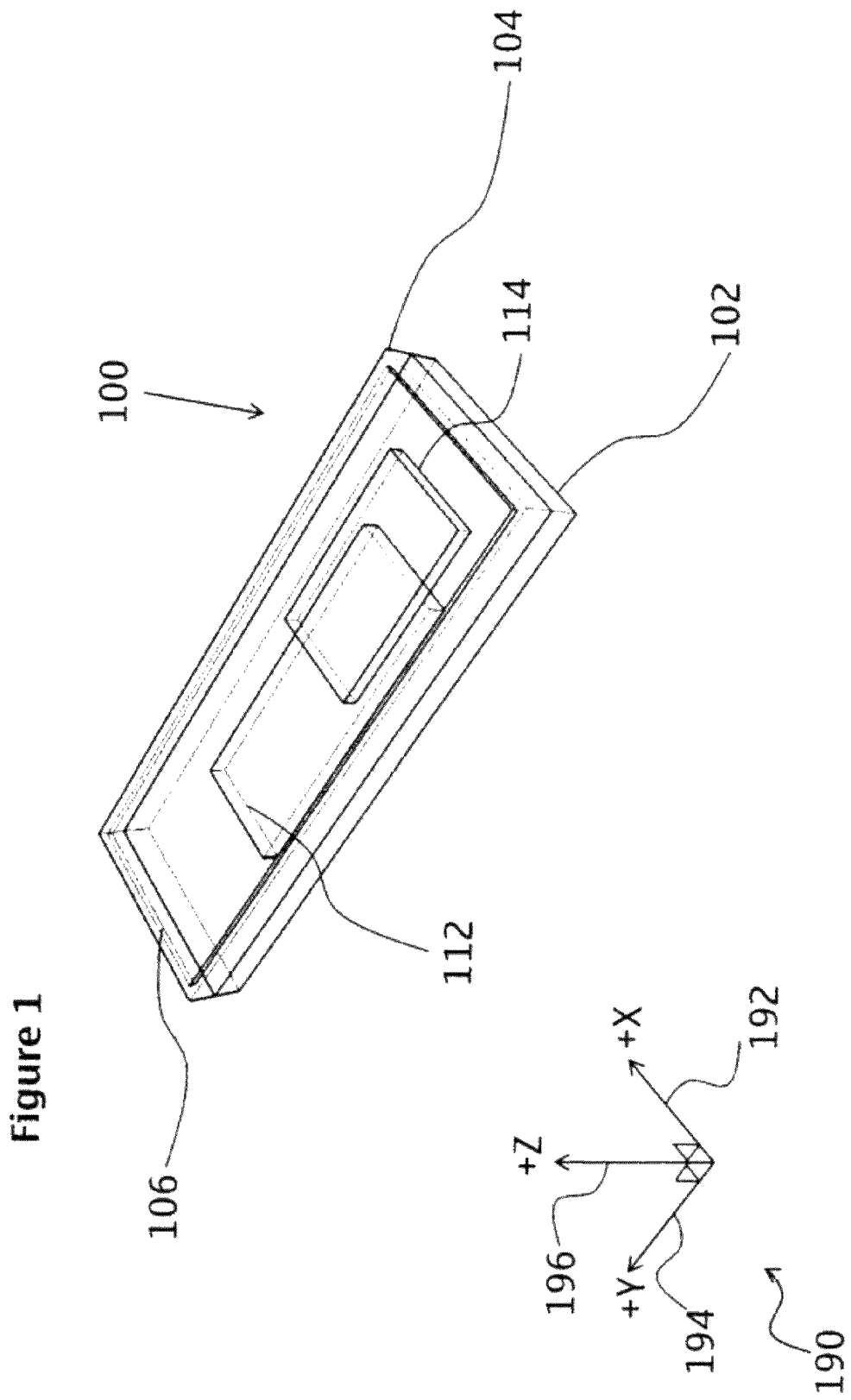
FIG. 1 illustrates a perspective view of a closed configuration of an apparatus according to an embodiment of the invention.
Figure 2:
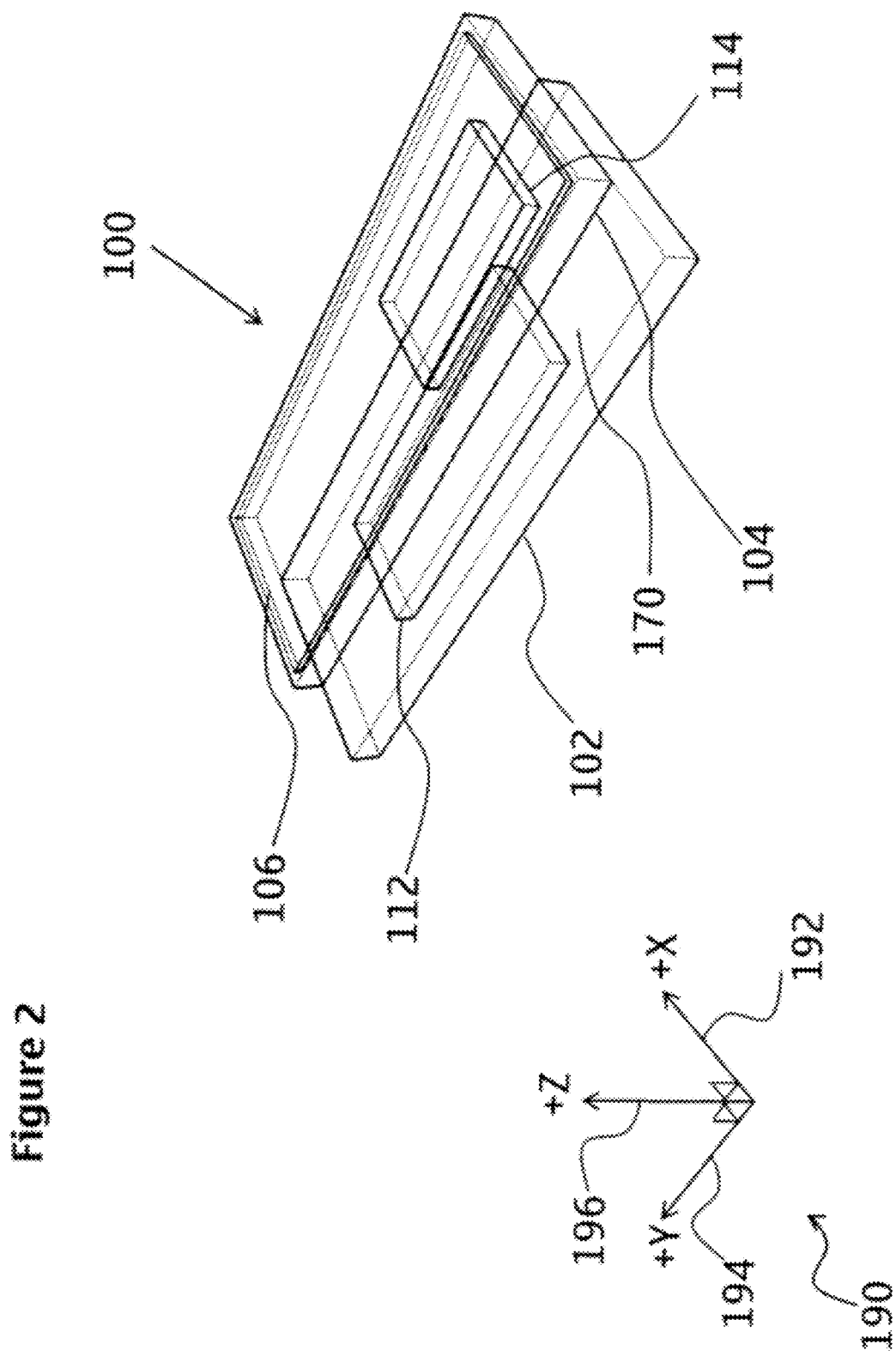
FIG. 2 illustrates a perspective view of an open configuration of an apparatus according to an embodiment of the invention.
Figure 3:
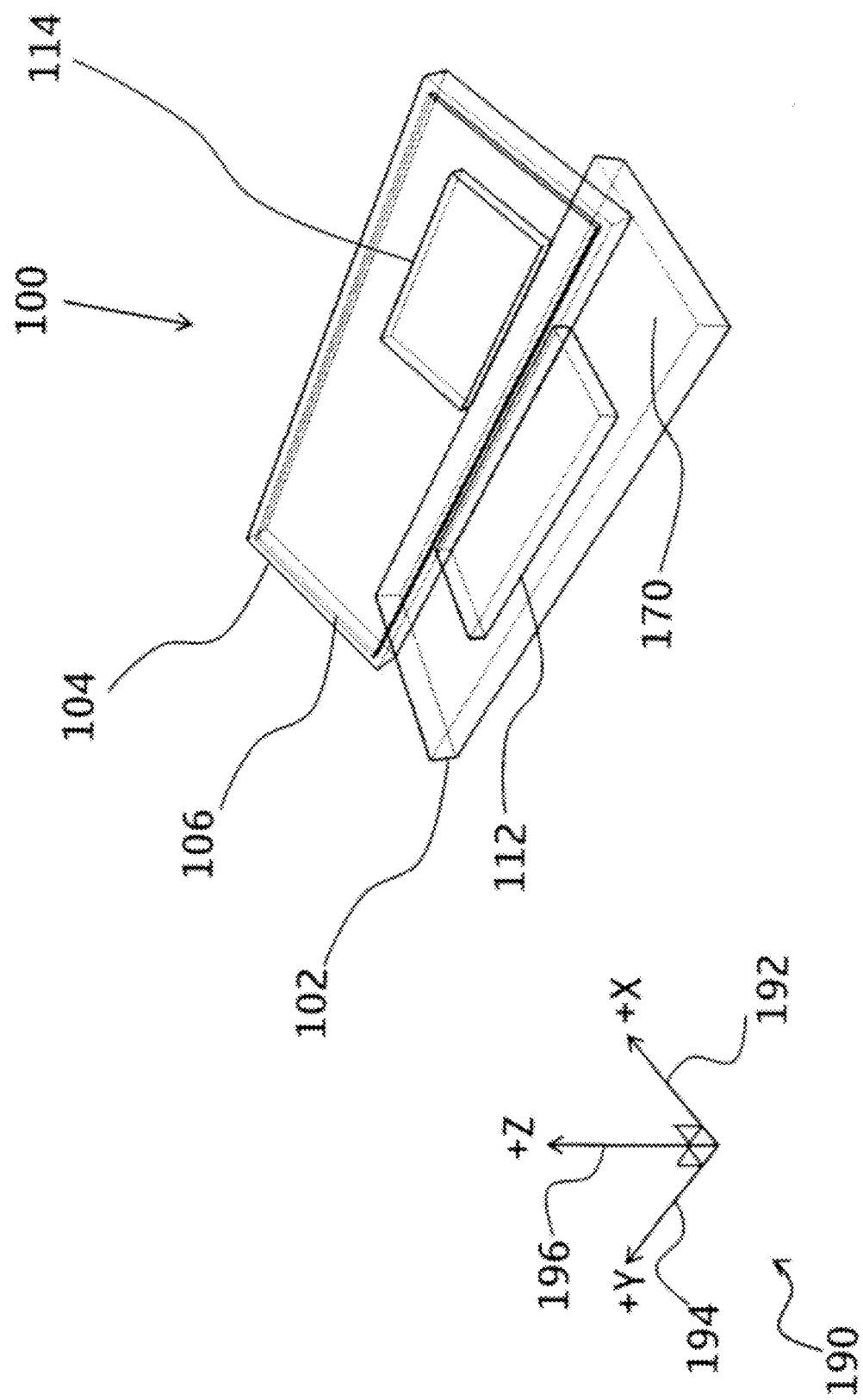
FIG. 3 illustrates a perspective view of an intermediate configuration of an apparatus according to an embodiment of the invention.

FIGS. 1, 2 and 3 illustrate a perspective view of an apparatus 100 according to an embodiment of the invention and a Cartesian co-ordinate axis 190. The Cartesian co-ordinate axis 190 includes an X axis 192, a Y axis 194 and a Z axis 196 which are orthogonal to one another.

FIGS. 1, 2 and 3 illustrate an apparatus 100 comprising a first body 102 comprising a first power source 112, and a second body 104 comprising a second power source 114 and a display 106, the second body 104 is configured to move relative to the first body 102 between a closed configuration and an open configuration via at least one intermediate configuration, and when the apparatus 100 is in at least one of the open and closed configurations the first power source 112 is configured to power the display 106, and when the apparatus 100 is in the at least one intermediate configuration the second power source 114 is configured to power the display 106.

In an embodiment the apparatus 100 comprises a first body 102 and a second body 104 which are configured to be moveably connected to one another. The first body 102 comprises a first power source 112, and the second body 104 includes a second power source 114 and a display 106. The first body 102 is configured to move relative to the second body 104 between a closed configuration and an open configuration via at least one intermediate configuration. When the apparatus is in at least one of the closed and open configurations the first power source 112 is configured to power the display 106, and when the apparatus is in at least one intermediate configuration the second power source 114 is configured to power the display 106.

In an embodiment the apparatus 100 may be a portable electronic device. The apparatus 100 may, for example, be a hand portable device. It may, for example, be a mobile cellular telephone or a personal music, video or computing device or a digital camera. In other embodiments the apparatus 100 may be a module for an electronic device.

The apparatus 100 includes first and second bodies 102, 104 which move relative to one another from the closed configuration of the apparatus 100 as illustrated in FIG. 1, to the open configuration of the apparatus 100 as illustrated in FIG. 3, via at least one intermediate configuration of the apparatus 100 as illustrated in FIG. 2. The closed configuration may be selected by a user of the apparatus 100 when the user wishes to keep the apparatus compact or in his/her pocket, for example.

In an embodiment the open configuration may be selected by a user of the apparatus 100 when the user wishes to utilize a further input device (not illustrated in FIGS. 1, 2 and 3) which may be disposed on a surface 170 of the first body 102, as illustrated in FIGS. 2 and 3. The surface 170 may not be entirely accessible when the apparatus 100 is in the closed configuration, therefore the further input device may be at least partially hidden from the user when the apparatus 100 is in the closed configuration. The further input device may be a keyboard with mechanical keys or it may be a touch screen which may be used as a keyboard input device in addition to operating as an output device, such as a display.

In an embodiment the display 106 of the apparatus 100 which may be visible to the user of the apparatus 100 in any configuration of the apparatus 100. It should be appreciated that in other embodiments the display 106 may be partially or completely hidden from the user in one or more configurations of the apparatus 100.

In FIGS. 1, 2 and 3 the display 106 is shown as extending across the majority of a top surface of the second body 104. For example if the top surface had dimensions of 100 mm by 40 mm then the display 106 may have a display area of 90 mm by 30 mm, but alternatively the display 106 may cover only a small proportion of the total surface area of a surface of the second body 104. For example, the display 106 may have a display area of 30 mm×20 mm. The display 106 may be disposed on any surface of the second body 104.

In an embodiment when the apparatus 100 is in the at least one intermediate configuration, the second body 104 initially slides relative to the first body 102 in the +X direction along the x axis 192 until the second body 104 reaches a predetermined point, as illustrated in FIG. 2. The second body 104 then starts to tilt relative to the first body 102 in the XZ plane, as illustrated in FIG. 3. Once the second body 104 has come to the end of its travel in the tilt movement, the apparatus 100 may then be said to be in the open configuration. The at least one intermediate configuration may be considered to be a movement or transition configuration. FIG. 2 illustrates one point in time during the at least one intermediate configuration. It should be appreciated that FIG. 2 is only representative of part of the overall movement during the at least one intermediate configuration. In an embodiment the open and closed configurations are stationary configurations of the apparatus 100. It should also be appreciated that the apparatus 100 may be changed from the open configuration to the closed configuration via the at least one intermediate configuration, or in other words, to make the configuration transition in reverse to the one described above.

In an embodiment during the at least one intermediate configuration the apparatus 100 will have no power coupled between the first power source 112 and the display 106. This is because there may be no method of coupling the display 106 to the first power source 112 during the at least one intermediate configuration. Therefore during the at least one intermediate configuration the apparatus 100 will require an additional power source for the display 106 in order for the display 106 to continue displaying an image, video or text. During the at least one intermediate configuration the display 106 may hold an image displayed by the display 106 and a second power source 114 may power the display 106 whilst the first power source 112 is disconnected from the display 106.

The first power source 112 may be a conventional battery or arrangement of one or more cells, for example lithium ion or NiCd (Nickel Cadmium), as is known in the art of portable electronic devices, whereas the second power source 114 may be a supercapacitor. A supercapacitor provides the advantage of being smaller than a conventional battery and may additionally have a high power density and be able to be charged and discharged very quickly. This may be useful because a supercapacitor 114 placed next to the display 106 in the second body 104 reduces the burst power peaks, which typically occur through traditional body hinge interconnections, like for example FPC and MCX type interconnections. When the power is no longer supplied through such traditional body hinge interconnections, and instead through use of a local power source, these burst power peaks may be avoided. The power delivered to the display may also be maintained by the supercapacitor, in other words power drops are avoided, as high current peaks are generated when displaying video formats on the display 106.

Figure 4:
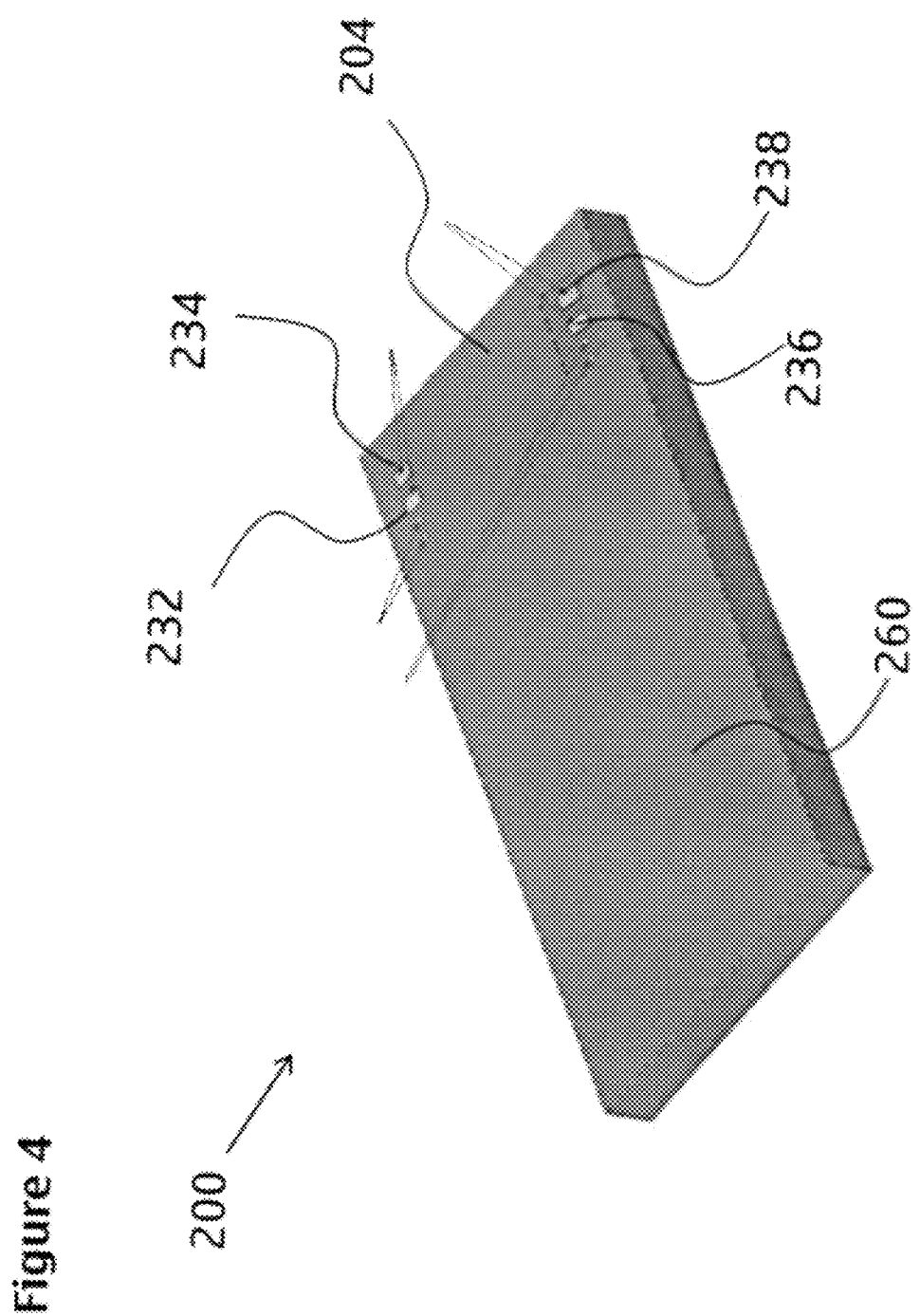
FIG. 4 illustrates a perspective view of a second body of an apparatus according to an embodiment of the invention.
Figure 5:
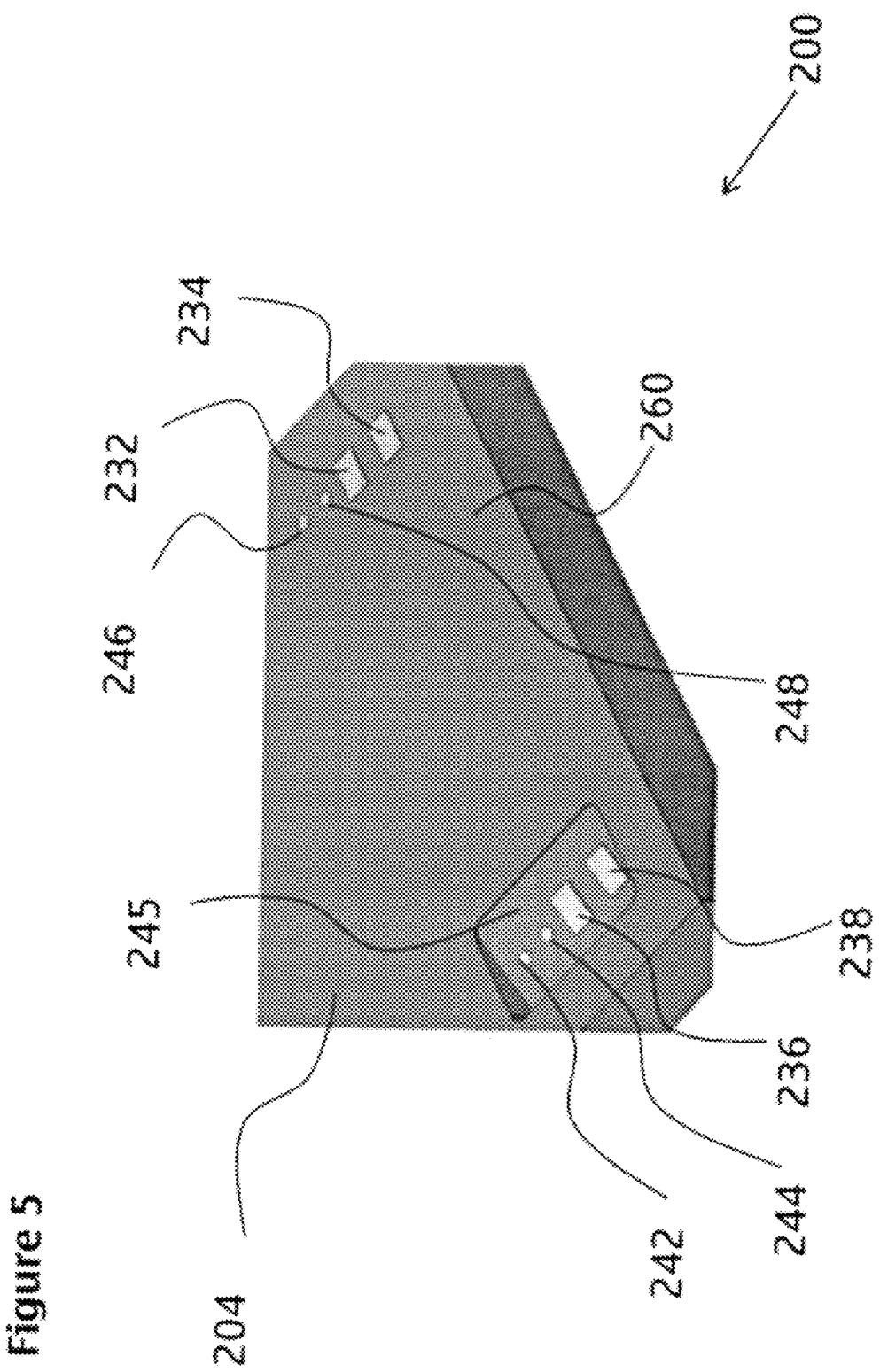
FIG. 5 illustrates a perspective view of an arrangement of terminals of a second body of an apparatus according to an embodiment of the invention.
Figure 6:
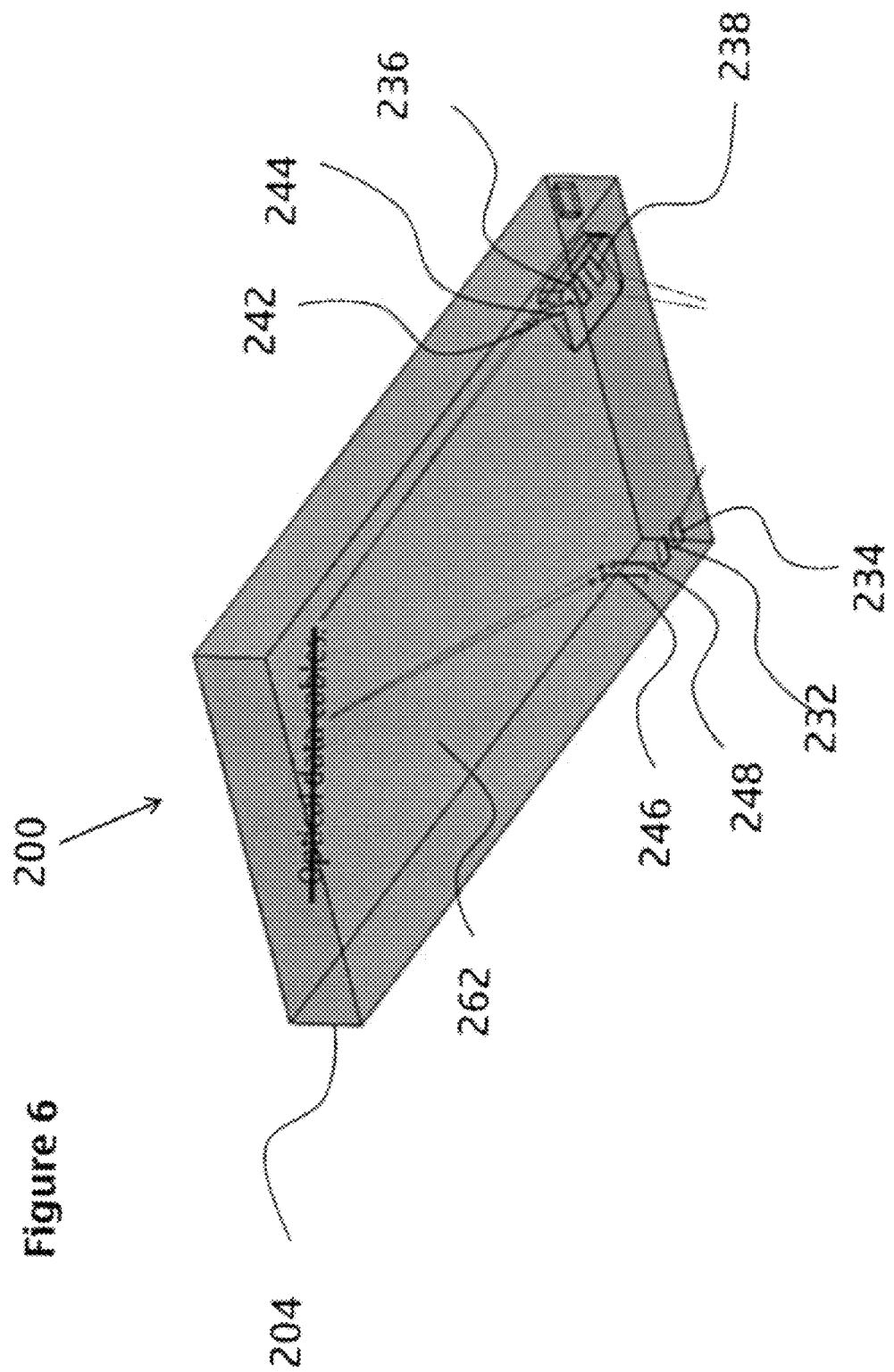
FIG. 6 illustrates a perspective view of the second body of FIG. 4 inverted to illustrate a second surface of an apparatus according to an embodiment of the invention.
Figure 7:
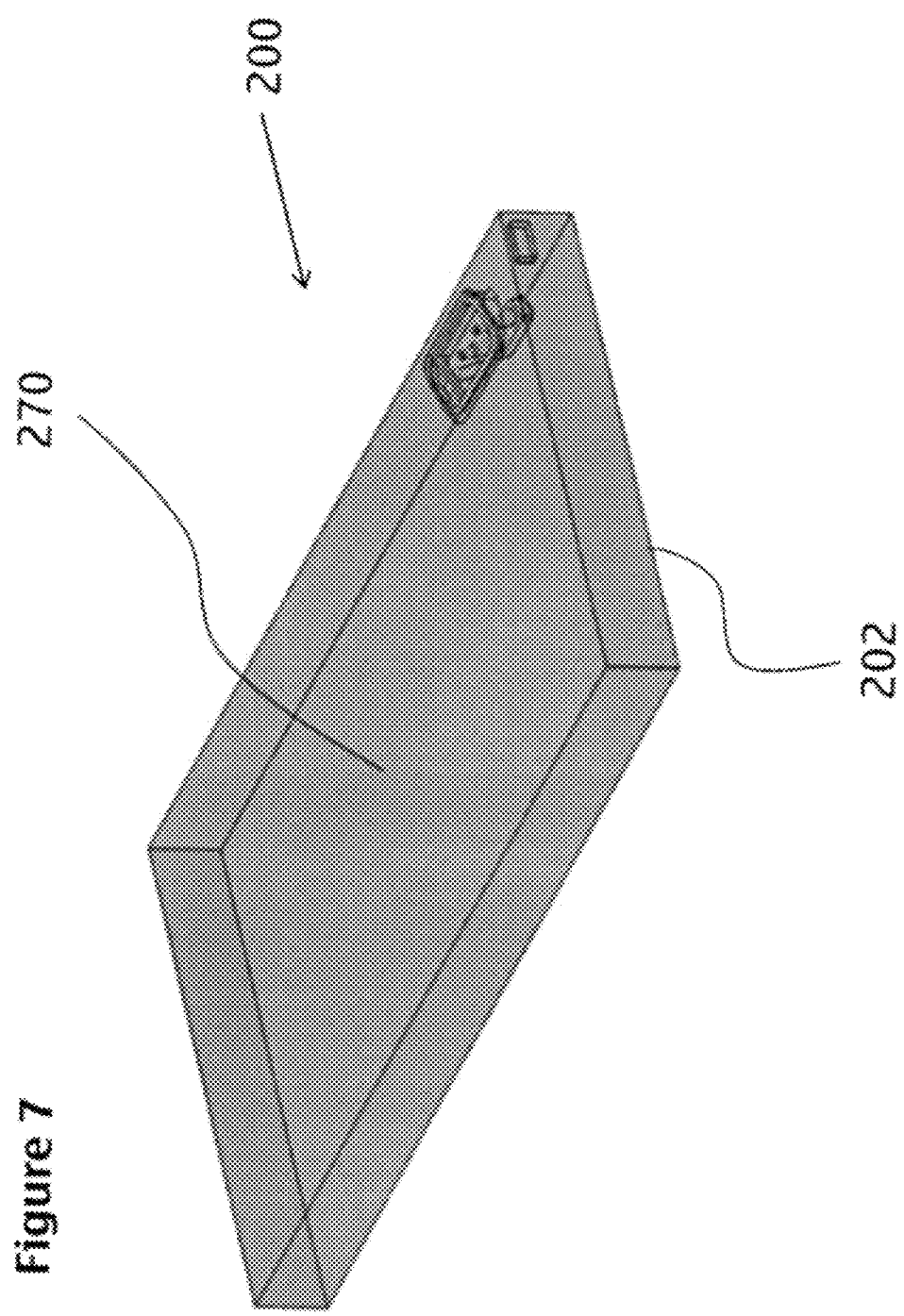
FIG. 7 illustrates a perspective view of a first body of an apparatus according to an embodiment of the invention.
Figure 8:
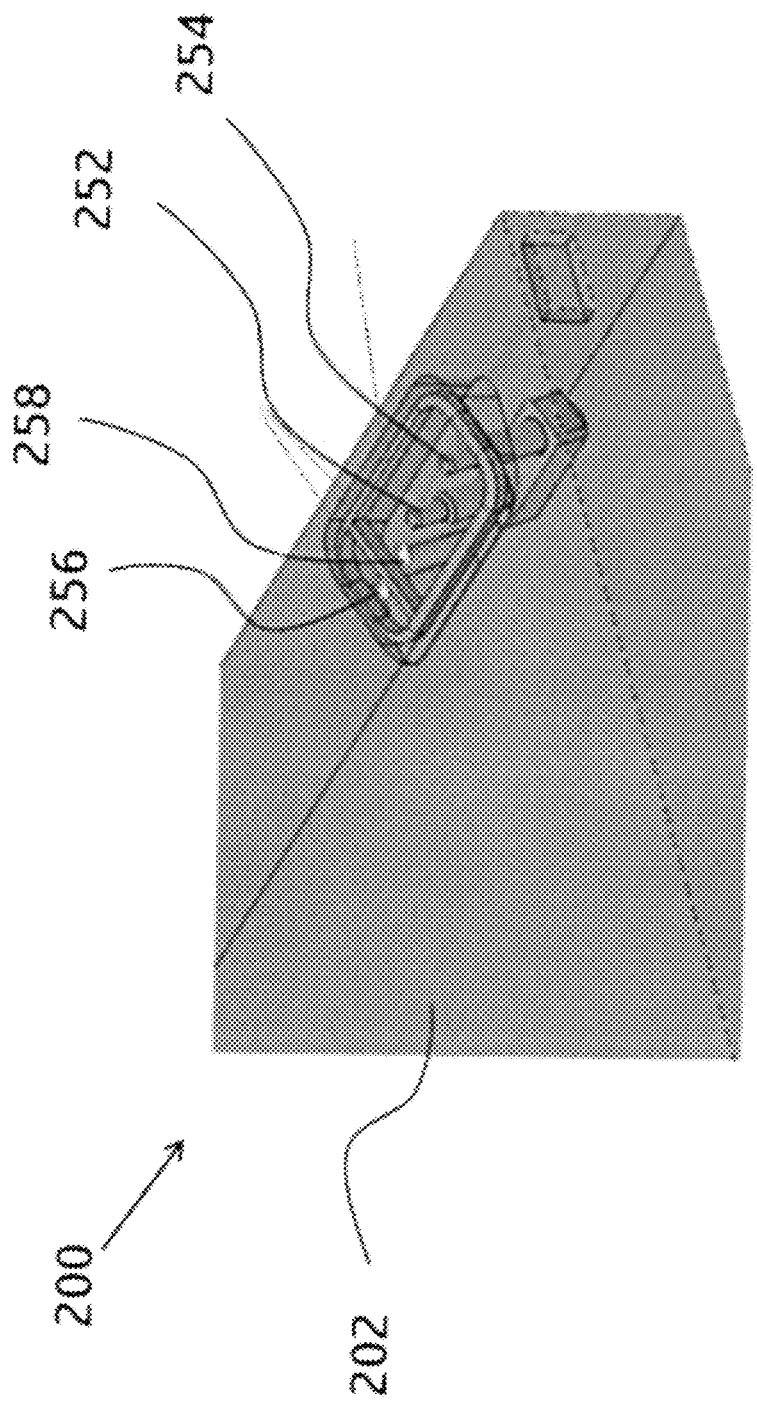
FIG. 8 illustrates a perspective view of at least one terminal disposed in a first body of an apparatus according to an embodiment of the invention.

In an embodiment FIGS. 4, 5, 6, 7 and 8 illustrate a perspective view of an apparatus 200 in more detail. More specifically FIGS. 4, 5 and 6 illustrate the second body 204, and FIGS. 7 and 8 illustrate the first body 202 in more detail as separate components or modules of the apparatus 200.

In an embodiment FIG. 4 illustrates the second body 204 and in particular a first surface 260 of the second body 204 which is a surface which may touch, run parallel to (whilst not touching) or abut, as non-limiting examples, a first surface 270 of the first body 202 (as illustrated in FIGS. 7 and 8). The first surface 260 may be a bottom surface of the second body 204. The second body 204 may further comprise at least one first terminal 232, 234, and at least one second terminal 236, 238. In the example embodiment, two individual terminals are illustrated for the at least one first and second terminals, but this need not be a limitation and there may only be one terminal required, or even no limit to the number of individual terminals in other embodiments.

In an embodiment FIG. 5 illustrates the at least one first and second terminal in more detail. A sloped or inclined surface 245 set into the first surface 260, such that it does not protrude above the first surface 260 of the second body 204, is provided so that the at least one second terminal 236, 238 are set at a predetermined angle relative to the first surface 260. This is so that when the apparatus 200 is in the closed configuration (as illustrated in FIG. 1) the at least one second terminal 236, 238 are configured to couple with corresponding at least one third terminal 252, 254 of the first body 202 (as illustrated in FIGS. 7 and 8).

In an embodiment FIG. 6 illustrates a second surface 262 of the second body 204. In an embodiment, the second surface 262 is the surface in which the display 206 is disposed as illustrated in FIGS. 1, 2 and 3. The second surface 262 may be a top surface of the second body 204. The second surface 262 is substantially parallel to the first surface 260.

In the example embodiment, the at least one first and second terminals 232, 234, 236 and 238 of the second body 204 are configured to electrically couple to the at least one third terminal 252, 254 of the first body 202. The first body 202 may also comprise a first power source 112 (as illustrated in FIGS. 1, 2 and 3) and when the apparatus 200 is in the open configuration the first power source 112 is configured to power the display 206 (as illustrated in FIGS. 1, 2, and 3), but that the display 206 is disposed in the second body 204. It is therefore necessary to provide power between the first power source 112 and the display 206 using an electrical and/or mechanical method. As previously mentioned, during the at least one intermediate configuration of the apparatus 200 the at least one first and second terminals 232, 234, 236 and 238 are electrically decoupled from the at least one third terminal 252, 254, and therefore power is temporarily lost between the first power source 112 and the display 206.

The at least one first and second terminals 232, 234, 236, and 238 disposed on the second body 204 may be used as power terminals, and for example, terminal 232 is a first power terminal, terminal 234 is a second power terminal, terminal 236 is a third power terminal and terminal 238 is a fourth power terminal. Similarly, the at least one third terminals 252, 254 disposed on the first body 202 may also be used as power terminals. Terminal 252 is a fifth power terminal and terminal 254 is a sixth power terminal. The power terminals 232, 234, 236, and 238 may be configured to supply power in the form of direct current or alternating current, and for example, the first power terminal 232 may supply a ground potential or zero volts, whilst the second power terminal 234 may supply a positive or negative voltage potential with reference to the ground potential at the first power terminal 232.

Similarly, the third power terminal 236 may supply a ground potential or zero volts, whilst the fourth power terminal 238 may supply a positive or negative voltage potential with reference to the ground potential at the third power terminal 236. It should be appreciated that other arrangements of power terminals may be possible between the first and second bodies 202, 204 of the apparatus 200 and that we are not limited to the example embodiment described herein.

When the first and third power terminals 232, 236 are configured to provide a zero voltage potential, the second body 204 may comprise further electrical terminals between the first and third power terminals 232, 236 either directly or indirectly via a ground plane (not illustrated), for example. The ground plane may be formed on at least one layer of a printed wiring board (PWB), and may form a part of the overall ground plane of the apparatus 200. Equally, for example, a positive voltage potential may be provided to both the second power terminal 234 and to the fourth power terminal 238 so that both power terminals are supplied with the same voltage potential and with reference to the zero voltage potential provided by the first and third power terminals 232, 236. The second and fourth power terminals 234, 238 may be directly coupled or indirectly coupled via other components as known in the art.

The first and second power terminals 232, 234 are configured to be coupled to the first body 202 when the apparatus 200 is in the open configuration. For example, the first power terminal 232 is configured to couple power to the fifth power terminal 252 and the second power terminal 234 is configured to couple power to the sixth power terminal 254. The third and fourth power terminals 236, 238 are configured to be coupled to the first body 202 when the apparatus 200 is in the closed configuration. For example, the third power terminal 236 is configured to couple power to the fifth power terminal 252 and the fourth power terminal 238 is configured to couple power to the sixth power terminal 254. By having the physical arrangement of sets of terminals or even single terminals at different physical locations of the first and second bodies 202, 204, the first body 202 may be coupled to the second body 204 when the apparatus 200 is in at least one of the open and closed configurations. However, whilst the first body 202 is moved relative to the second body 204, in other words, during the at least one intermediate configuration, this electrical coupling will be lost, and it would therefore be advantageous to have an intermediate or second power source 214 separate to that of the first power source 212 so that any electronics disposed in the second body 204 will remain powered during the at least one intermediate configuration of the apparatus 200.

Although in FIGS. 4, 5, 6, 7 and 8 the electrical coupling between power terminals is described as a galvanic connection, in other embodiments it may be possible to electromagnetically couple electrical energy from a terminal disposed in the first body 202 to another terminal disposed in the second body 204. By 'electromagnetically couple' it is meant that there is no galvanic connection between two terminals, but that electrical energy is capacitively or inductively coupled across an air or insulative gap disposed between the two terminals. Typically, the terminals may be physically close to one another when coupling is arranged to occur, for example, the terminals may have a separation gap of less than 2 mm.

In an embodiment, in addition to power, it may also be necessary to couple data and/or signals between the display 206 and one or more of a processor, digital circuitry, memory circuitry and functional circuitry, at least during one or more of the open and closed configurations of the apparatus 200. For example, imaging data is coupled between the display 206 and a processor 580 (as illustrated in FIG. 5), but the processor 580 is disposed in the first body 202 whereas the display 206 is disposed in the second body 204. Therefore, during the at least one intermediate configuration there is no data exchanged between the processor 580 and the display 206, and the display 206 is cut off from the processor because the physical coupling between the first body 202 and the second body 204 is interrupted temporarily. The coupling of the data and/or signals may be provided via galvanic, electromagnetic or optical terminals between the first and second bodies 202, 204 as will be described below.

During the at least one intermediate configuration only the coupling of power to the display 206 is maintained so that an image, text or video displayed by the display 106 is frozen or held until the apparatus 200 is in at least one of the open and closed configurations, and the data and/or signals are re-coupled between the first and second bodies 202, 204 and full functionality of the apparatus 200 may then be resumed.

The apparatus 200 may therefore have further terminals for coupling these other types of electrical signals between the first body 202 and the second body 204. These electrical signals, other than power signals, may be, as non-limiting examples, data signals, control signals, radio frequency (RF) signals and the like. They may be digital or analogue signals. They may be interconnected between different circuits, modules or electrical blocks via different methods, for example, the interconnections may be printed conductive tracks on printed wiring boards (PWBs) or flexible printed circuits (FPCs), coaxial cables, optical cables or glass fibres as used in fibre optic links, microstrip, co-planar waveguides, and microwave waveguides as used in microwave radio frequency applications, etc.

As is known in the art, displays, such as Thin Film Transistor (TFT), Liquid Crystal Displays (LCD) or Organic Light Emitting Diode (OLED) displays require not only power for their operation but also the signals required so that an image, text or video may be displayed on the display, in other words signals other than power signals or 'non-power signals'. By 'non-power signal' it is intended that this means any signal other than that required solely for powering a circuit, module or device disposed in the apparatus 200. These display signals may be one or more of the following, and not limited to: analogue video signals, digital video signals, digital data signals, digital control signals, and digital addressing signals as is known in the art. These signals may be provided by a processor 580 (as illustrated in FIG. 5) of the apparatus 200, or by some other electronic circuitry which may be constrained to be disposed in the first body 202 of the apparatus 200. As the apparatus 200 may be a multi-part portable electronic device, and as the electronic circuitry, for example a processor 580, and a display 206 may be located in different parts of the multi-part portable electronic device due to the congestion of modern high density electronic equipment. It may therefore be advantageous to provide some way of interconnecting them during at least one configuration of the apparatus 200.

The terminals 232, 234, 236, 238 in FIGS. 4, 5 and 6 illustrate one such use for power, but for signals other than power, the second body 204 may additionally comprise further terminals 242, 244, 246, and 248 so that these non-power signals may be coupled between the electronic circuitry and the display in at least the open and closed configurations of the apparatus 200. In an embodiment, terminal 242 is a first non-power signal terminal, terminal 244 is a second non-power signal terminal, terminal 246 is a third non-power signal terminal and terminal 248 is a fourth non-power signal terminal.

In an embodiment FIGS. 7 and 8 illustrate the non-power signal terminals 242 and 244 which couple to corresponding non-power signal terminals 256 and 258 disposed in the first body 202, where terminal 256 is a fifth non-power signal terminal and terminal 258 is a sixth non-power signal terminal, when the apparatus 200 is in the closed configuration. So the first non-power signal terminal 242 couples to the fifth non-power signal terminal 256, and the second non-power signal terminal 244 couples to the sixth non-power signal terminal 258 when the apparatus 200 is in the closed configuration.

When the apparatus 200 is in the open configuration the first and fifth non-power signal terminals 242 and 256 are decoupled, and the second and sixth non-power signal terminals 244 and 258 are electrically decoupled, and as the first and second bodies 202 and 204 are now in a completely different relative physical location the third non-power signal terminal 246 couples to the fifth non-power signal terminal 256 and the fourth non-power signal terminal 248 couples to the sixth non-power signal terminal 258. It should therefore be appreciated that in the same way that the power terminals are interrupted during movement of the apparatus between the open and closed configurations of the apparatus 200, that the non-power signal terminals will also be interrupted or decoupled during the at least one intermediate configuration of the apparatus 200. The non-power signals should therefore be frozen or held in memory with respect to time during this transitionary period of time until the non-power signal terminals are re-coupled upon exiting the at least one intermediate configuration of the apparatus 200.

In an embodiment, FIGS. 9 to 13 illustrate a side view of an apparatus 300 during the relative movement of first and second bodies 302, 304 and a Cartesian co-ordinate axis 390. The Cartesian co-ordinate axis 390 includes an X axis 392 and a Z axis 396 which are orthogonal to one another. The open, closed and the at least one intermediate configurations of the apparatus 300 are illustrated in more detail in FIGS. 9 to 13 as described below.

Figure 9:
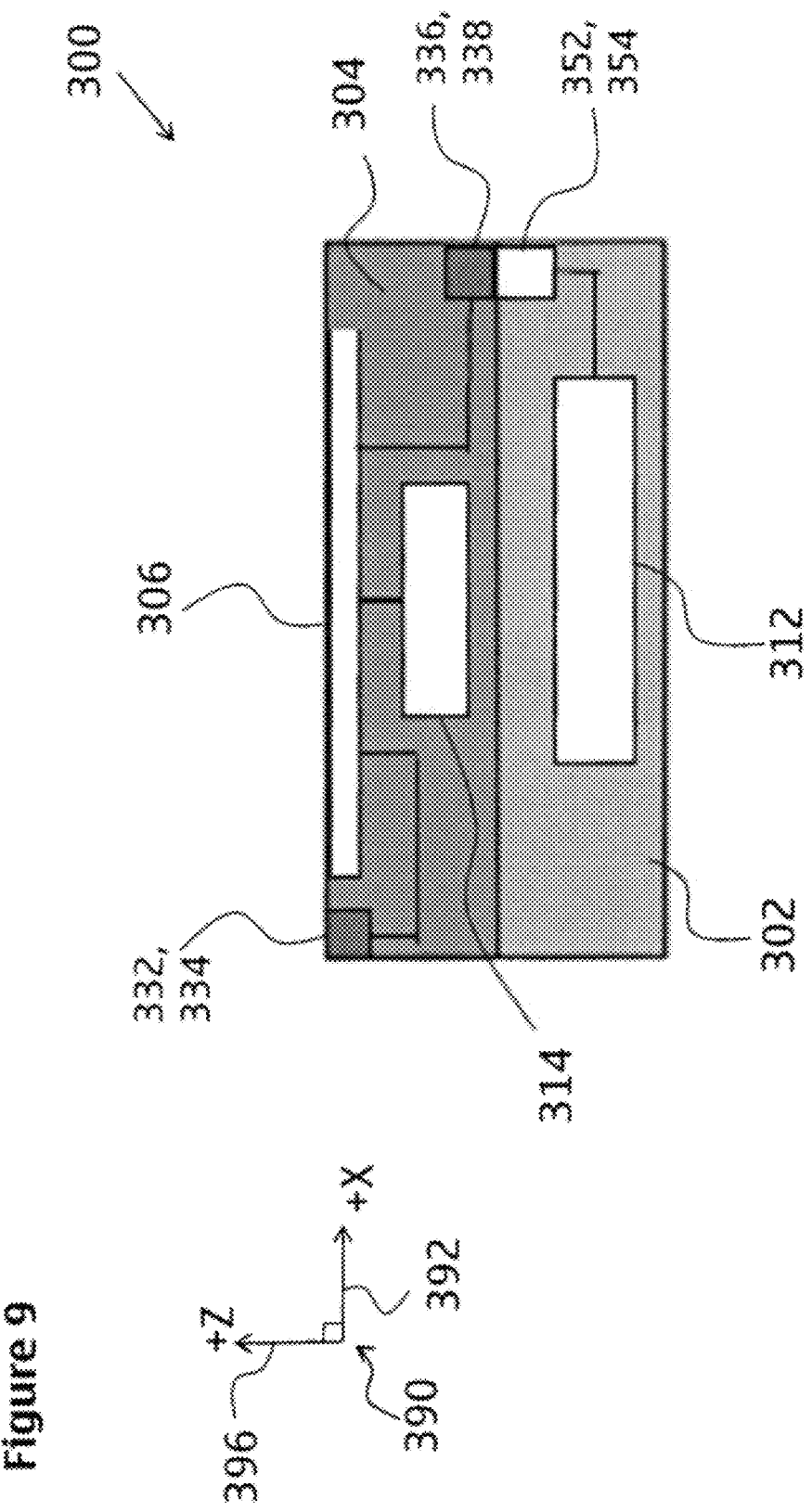
FIG. 9 illustrates a side view of a closed configuration of an apparatus according to an embodiment of the invention.

In an embodiment FIG. 9 illustrates the apparatus 300 in the closed configuration and the first body 302 substantially overlays the second body 304. In FIG. 9, the first power source 312 is coupled to the at least one third power terminal 352, 354 which are all disposed within the first body 302. The display 306, second power source 314, at least one first power terminal 332, 334 and at least one second power terminal 336, 338 are disposed within the second body 304. The display 306 is coupled to both the at least one first and second power terminals 332, 334, 336, and 338. The at least one second power terminal 336, 338 are coupled to the at least one third power terminal 352, 354 due to the relative positioning of the first and second bodies 302, 304 in the closed configuration of the apparatus 300. In the closed configuration, the display 306 is powered by the first power source 312 via the at least one second power terminal 336, 338 and the at least one third power terminal 352, 354.

Figure 10:
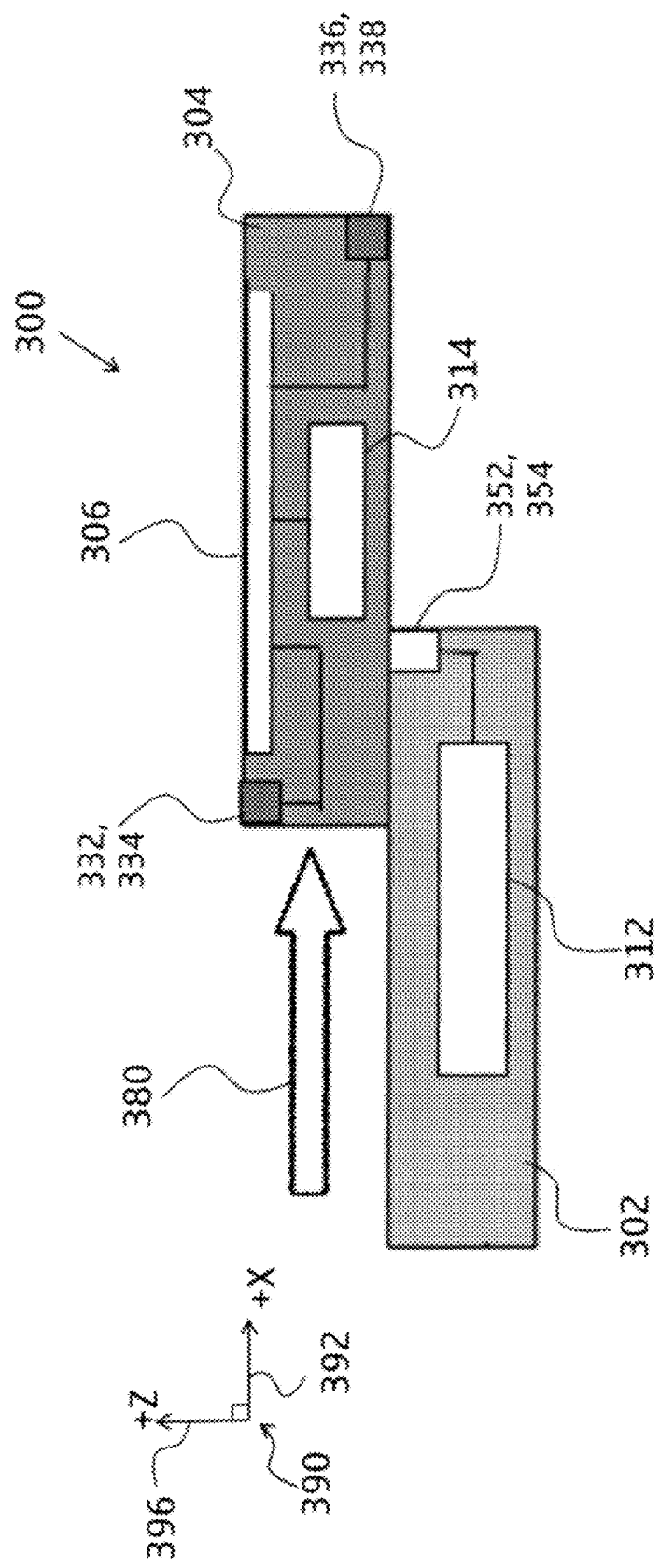
FIG. 10 illustrates a side view of an intermediate configuration of an apparatus when the second body initially slides relative to the first body according to an embodiment of the invention.

In an embodiment FIG. 10 illustrates at least one intermediate configuration of the apparatus 300, the second body 304 initially slides relative to the first body 302 and the at least one third power terminal 352, 354 is now decoupled from the at least one second power signal terminal 336, 338. In other words there is now no electrical connection between the first and second bodies 302, 304 during the at least one intermediate configuration. The slide direction of the second body 304 relative to the first body 302 is illustrated by the arrow 380 in FIG. 10. The display 306 is now frozen and images, text or video are held in memory so that the user may only see a frozen image, text or video displayed by the display 306.

The display 306 is now configured to be powered by the second power source 314 which in this example embodiment is a supercapacitor.

Figure 11:
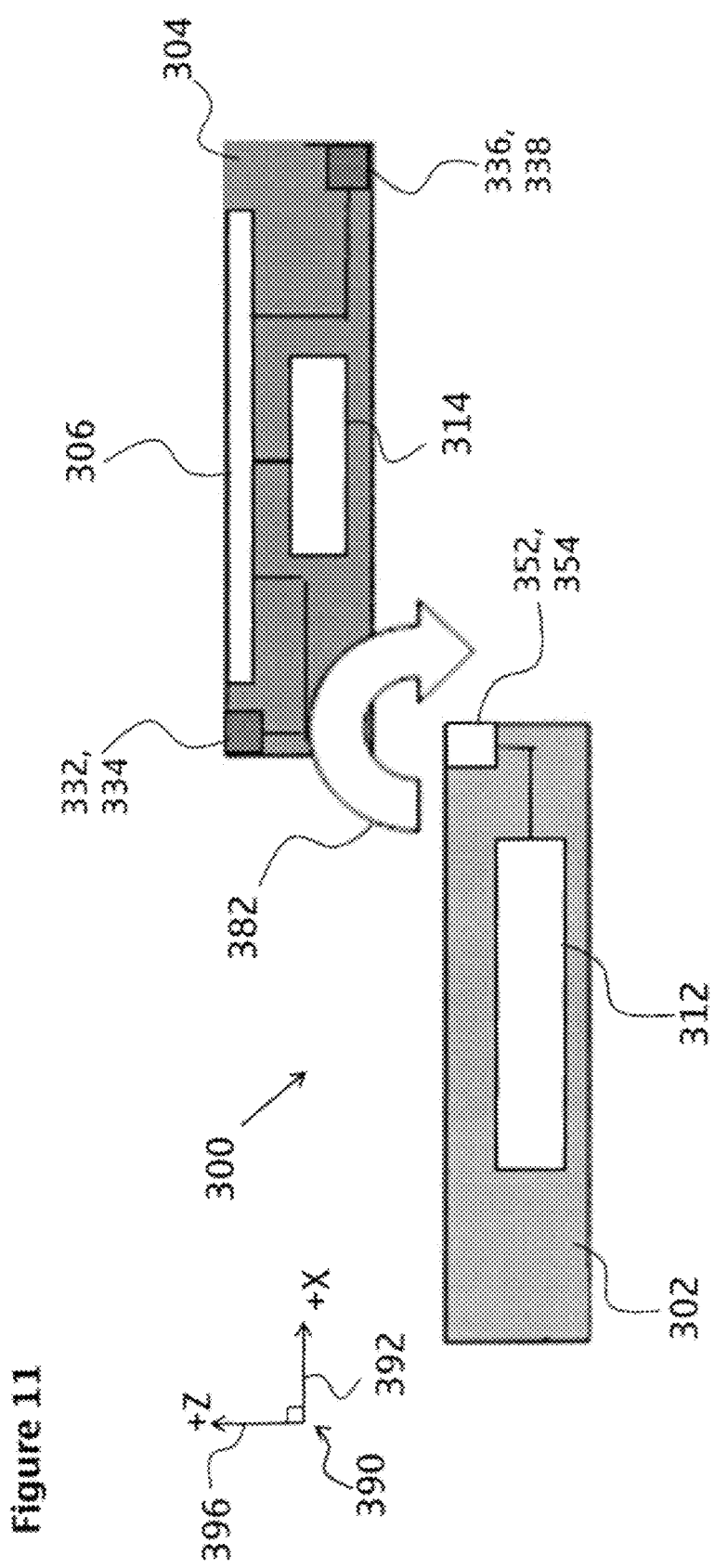
FIG. 11 illustrates a side view of an intermediate configuration of an apparatus when the second body rotates relative to the first body according to an embodiment of the invention.

In an embodiment FIG. 11 illustrates at least one intermediate configuration of the apparatus 300 and following the sliding movement of the second body 304 as described with reference to FIG. 10, now the second body 304 is configured to rotate relative to the first body 302. The direction of rotation of the second body 304 relative to the first body 302 is illustrated by the arrow 382 in FIG. 11. The display 306 is still configured to be powered by the second power source 314.

Figure 12:
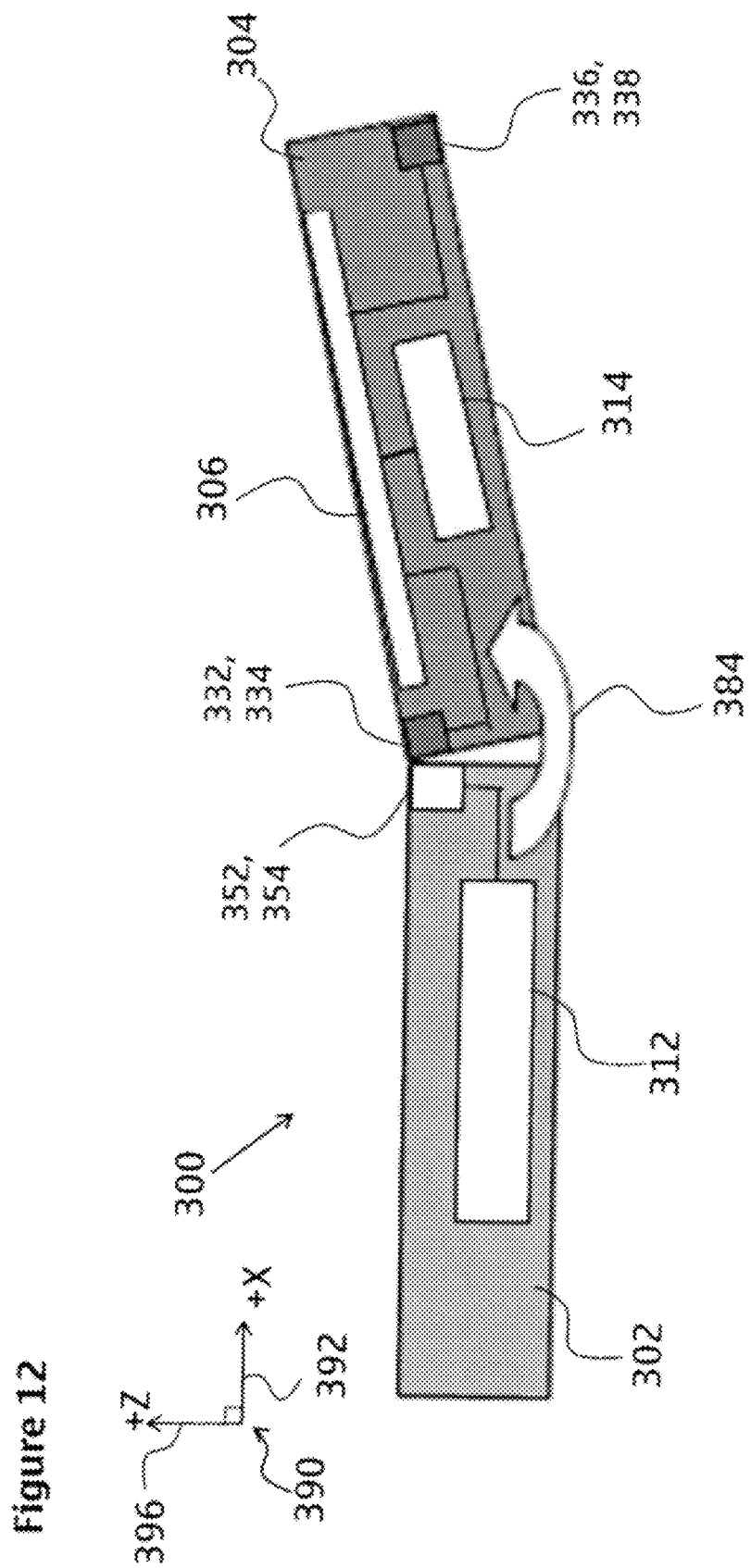
FIG. 12 illustrates a side view of a partially open configuration of an apparatus according to an embodiment of the invention.

In an embodiment FIG. 12 illustrates when the second body 304 is approximately at the end of the rotational movement as described with reference to FIG. 11, for example, at around 25 degrees from the end of the rotational travel, terminals 352, 354, 332, 334 are then re-coupled between the first and second bodies 302, 304. The apparatus 300 is now in the open configuration because the at least one first power terminal 332, 334 are now coupled to the at least one third power terminal 352, 354 so that the first power source 312 is now re-coupled to the display 306 and the second power source 314 is now disconnected from the display 306. The display 306 now resumes real time activity and updates from the processor. The at least one second power terminal 336, 338 are no longer coupled to the at least one third power terminal 352, 354.

Figure 13:
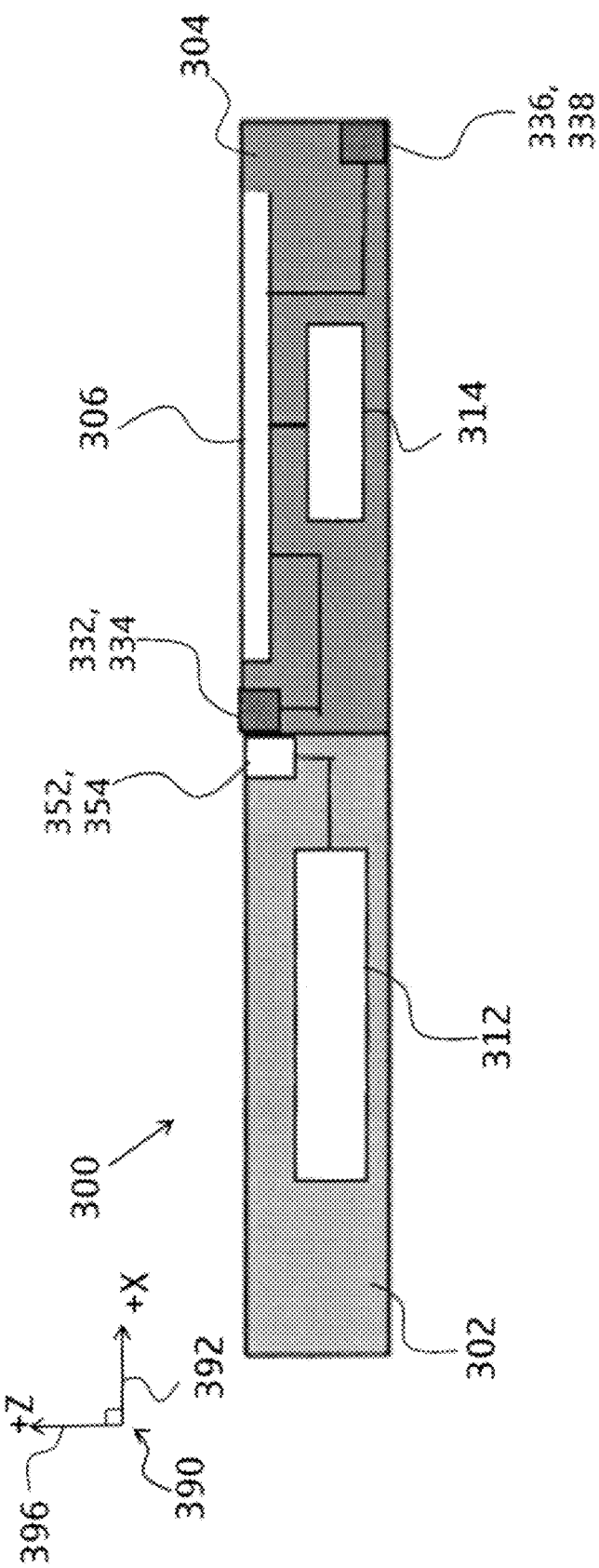
FIG. 13 illustrates a side view of a fully open configuration of an apparatus according to an embodiment of the invention.

In an embodiment FIG. 13 illustrates the end of the movement sequence and once the second body 304 has come to the end of the rotational movement the user may then continue to use the apparatus 300 in the open configuration. In the open configuration of the apparatus 300, the first and second bodies 302, 304 are configured to be positioned in a substantially co-planar relationship. In other embodiments, the connections may not be restored until the second body 304 has completely reached the end of the rotational movement, as illustrated in FIG. 13. The user may now access and use, for example, an input, output or an input/output device located on a surface (for example surface 170 of FIG. 2) of the first body 302 whilst being able to see images displayed on the display 306.

It should be appreciated that in the example embodiment described with reference to FIGS. 9, 10, 11, 12 and 13, that the terminals 332, 334, 336, 338, 352, 354 are located on different surfaces or locations of the bodies 302, 304 as compared to that of the embodiment described with reference to FIGS. 1, 2, 3, 4, 5, 6, 7 and 8, due to the different mechanism employed for moving the bodies 302, 304.

In an embodiment FIGS. 14 to 17 illustrate a side view of an apparatus 400 in various configurations of the apparatus 400 and a Cartesian co-ordinate axis 490. The Cartesian co-ordinate axis 490 includes an X axis 492 and a Z axis 496 which are orthogonal to one another.

In an embodiment the apparatus 400 has a different mechanism for moving the first body 402 relative to the second body 404. The first body 402 is slideable relative to the second body 404 in at least two planes when the apparatus 400 is in at least one intermediate configuration. As illustrated in FIG. 14, when the apparatus 400 is in the at least one intermediate configuration, the second body 404 initially slides relative to the first body 402 in a first direction, the +X direction (a first plane), until the second body 404 reaches a predetermined point. Then, as illustrated in FIG. 15 and FIG. 16 when the apparatus 400 is in at least one intermediate configuration, the second body 404 slides relative to the first body 402 in a second direction, different to the first direction. The movement of the second body 404 relative to the first body 402 in the second direction is in the −Z direction (a second plane).

Once the second body 404 has come to the end of its travel in the second slide movement, as illustrated in FIG. 17, the apparatus 400 is then in the open configuration.

A similar power connection arrangement is used in the apparatus 400 as that used in the apparatus 300. As illustrated in FIG. 17, the at least one third power terminal 452, 454 is arranged at one end of the first body 402 and are coupled to the first power source 412. The first power source 412 is also disposed in the first body 412. The open configuration of the apparatus 400 is illustrated in FIG. 17 in detail and the at least one third power terminal 452, 454 is coupled to the at least one first power terminal 432, 434, the at least one first power terminal 432, 434 is disposed in the second body 404. The at least one first power terminal 432, 434 is coupled to the display 406 and therefore the apparatus 400 is configured to power the display 406 via the first power source 412. The at least one second power terminal 436, 438 is electrically de-coupled from the first power source 412 when the apparatus 400 is in the open configuration.

In an embodiment FIG. 18 shows a schematic block diagram of an apparatus 500. The apparatus 500 comprises a processor 580, which may be any processor or computer device with a control unit which performs control based on software routines of a control program stored in an internal memory 586 such is and not limited to RAM (Random Access Memory), ROM (Read Only Memory), EEPROM (Electrically Erasable Programmable Read Only Memory), and/or internal/external memory or storage devices, such as a hard disc drive 587, a disc-based medium 588 (such as for example a floppy disc or CD-ROM (Compact Disc Read Only Memory) or DVD-ROM (Digital Versatile Disc ROM), or a memory stick 589. There may be more than one processor 580 disposed in the apparatus 500. The memory or storage devices 587 and 588 are illustrated in FIG. 18 as being internally disposed in the apparatus 500 but they may also be disposed externally to the apparatus 500 and may be configured to electrically couple to the apparatus 500. For example, a memory device such as a memory stick 589 may have a connector which plugs into a socket disposed on the apparatus 500. Program code instructions are fetched from at least one of the internal or external memories 586, 587, 588, 589 and are loaded to the control unit of the processing unit 580 in order to perform the processing. The processing may be performed on the basis of one or more data input to the processor 580 and the processor 580 may generate one or more data output, where a data input may correspond to an output from a sensor 584 and the data output may correspond to control information used for selecting either one of the power sources 512, 514 such that either the first power source 512 or the second power source 514 is coupled to the display 506 such that the display 506 is in a powered state when the apparatus 500 is in any configuration. As described previously, the first power source 512 may be coupled to the display 506 via at least one first terminal 532, 534 and at least one third terminal 552, 554 or via at least one second terminal 536, 538 and at least one third terminal, 552, 554.

In an embodiment, the configuration of the apparatus 500 is determined by an output from a sensor 584 (for example, an electromagnetic sensor, a reed switch with corresponding actuator, optical sensor, micro switch, mechanical switch, etc). The sensor 584 may comprise more than one element, for example, a reed switch has at least one corresponding magnetic element which in combination form the sensor 584. Therefore, the apparatus 500 may include a first magnetic element (not illustrated in FIG. 18) located in the first body 502 of the apparatus 500 and a corresponding reed switch (also not illustrated in FIG. 18, where the electrical contacts are normally open without the presence of a magnetic field from an electromagnet or permanent magnet) located in the second body 504 of the apparatus 500. The first magnetic element and the reed switch are so located in the bodies 502, 504 of the apparatus 500 so that they are substantially aligned with one another when the apparatus 500 is in the closed configuration. This means that the first magnetic element closes the electrical contacts within the reed switch and this determines that the apparatus 500 is in the closed configuration.

The apparatus 500 may also comprise a second magnetic element which may be located in the first body 502 of the apparatus 500 different to that of the first magnetic element. The second magnetic element is so located in the first body 502 so that it is substantially aligned with the reed switch located in the second body 504 when the apparatus 500 is in the open configuration.

When the apparatus 500 is in the intermediate configuration the electrical contacts within the reed switch are open because neither the first or second magnetic element is in close proximity to the reed switch.

In an embodiment there may be alternative methods of controlling which power source 512, 514 is coupled to the display 506 other than using a switch 582. The first and second power sources 512, 514 may have direct control inputs and therefore there is no need for an additional switch 582. It will be apparent to the skilled person that there are other methods of power control as is known in the art, and that FIG. 18 is only one example embodiment.

It will be apparent to the skilled person that the relative movement of the first and second bodies 502, 504 may be configured to be in different planes, and that these planes may be parallel or non-parallel planes. The first and second bodies 502, 504 may be configured to twist relative to one another in the XY plane, for example.

It will be appreciated to the skilled reader that the apparatus/device/server and/or other features of particular apparatus/device/server may be provided by apparatus arranged such that they become configured to carry out the desired operations only when enabled, for example switched on, or the like. In such cases, they may not necessarily have the appropriate software loaded into the active memory in the non-enabled (for example switched off state) and only load the appropriate software in the enabled (for example on state). The apparatus may comprise hardware circuitry and/or firmware. The apparatus may comprise software loaded onto memory. Such software/computer programs may be recorded on the same memory/processor and/or on one or more memories/processors.

It will be appreciated that the aforementioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (for example memory, signal).

With reference to any discussion of processor and memory (for example including ROM, CD-ROM etc), these may comprise a computer processor, Application Specific Integrated Circuit (ASIC), field-programmable gate array (FPGA), and/or other hardware components that have been programmed in such a way to curly out the inventive function.

In an embodiment FIG. 19 illustrates a flow diagram of a method for manufacturing an apparatus according to an embodiment of the invention. At block 610, the method includes providing a first body 102 having a first power source 112 and a second body 104 having a second power source 114 and a display 106. The first and second bodies 102, 104 may form a unitary apparatus.

At block 620, the method includes configuring the second body 104 to move relative to the first body 102 between a closed configuration and an open configuration via at least one intermediate configuration.

At block 630, the method includes configuring the first power source 112 to power the display 106 when the first and second bodies 102, 104 are in at least one of the open and closed configurations.

At block 640, the method includes configuring the second power source 114 to power the display 106 when the first and second bodies 102, 104 are in the intermediate configuration.

The method may further comprise, providing the second body 104 with at least one first terminal 232, 234 and at least one second terminal 236, 238 and the first body 104 with at least one third terminal 252, 254.

The method may further comprise, configuring at least one of the at least one first and second terminals 232, 234, 236, 238 to couple to the at least one third terminal 252, 254 such that power is coupled between the first power source 112 and the display 106 when the first and second bodies 102, 104 are in at least one of the open and closed configurations.

The blocks illustrated in FIG. 19 may represent steps in a method and/or sections of code in a computer program. For example, a controller or processor may execute the computer program to control machinery to perform the method illustrated in FIG. 19. The illustration of a particular order to the blocks does not necessarily imply that there is a required or preferred order for the blocks and the order and arrangement of the block may be varied. Furthermore, it may be possible for some blocks to be omitted.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
a first body comprising a first power source, and a second body comprising a second power source and a display,
the second body is configured to move relative to the first body between a closed configuration and an open configuration via at least one intermediate configuration, and
when the apparatus is in at least one of the open and closed configurations the first power source is configured to power the display, and when the apparatus is in the at least one intermediate configuration the second power source is configured to power the display, and
wherein the second body further comprises at least one first terminal and at least one second terminal and the first body comprises at least one third terminal, wherein when the apparatus is in at least one of the open and closed configurations at least one of the at least one first terminal and the at least one second terminal are configured to couple to the at least one third terminal such that power is coupled between the first power source and the display, and when the apparatus is in the at least one intermediate configuration the at least one first terminal and the at least one second terminal are configured to be decoupled from the at least one third terminal.

2. The apparatus according to claim 1, wherein the at least one first terminal and the at least one second terminal are coupled to the display.

3. The apparatus according to claim 1, wherein the at least one third terminal is coupled to the first power source.

4. The apparatus according to claim 1, wherein the second power source is coupled to the display.

5. The apparatus according to claim 1, wherein the display is arranged to display an image when the apparatus is in the at least one intermediate configuration.

6. The apparatus according to claim 1, wherein the first power source is a supercapacitor and the second power source is a battery.

7. The apparatus according to claim 1, further comprising a sensor for detecting the configuration of the apparatus.

8. The apparatus according to claim 7, further comprising a switch for coupling at least one of the first and second power sources to the display based on the detected configuration of the apparatus.

9. The apparatus according to claim 1, wherein the first body is slideable and tiltable relative to the second body when the apparatus is in the at least one intermediate configuration.

10. The apparatus according to claim 1, wherein the first body is rotateable relative to the second body when the apparatus is in the at least one intermediate configuration.

11. The apparatus according to claim 1, wherein the first body is slideable and rotateable relative to the second body when the apparatus is in the at least one intermediate configuration.

12. The apparatus according to claim 1, wherein the first body is slideable relative to the second body in at least two planes when the apparatus is in the at least one intermediate configuration.

13. The apparatus according to claim 1, wherein the apparatus is a portable electronic device.

14. A method comprising:
providing a first body having a first power source and a second body having a second power source and a display,
configuring the second body to move relative to the first body between a closed configuration and an open configuration via at least one intermediate configuration, and
configuring the first power source to power the display when the first and second bodies are in at least one of the open and closed configurations, and
configuring the second power source to power the display when the first and second bodies are in the at least one intermediate configuration, and wherein the method further comprises, providing the second body with at least one first terminal and at least one second terminal and the first body with at least one third terminal, and configuring at least one of the at least one first terminal and the at least one second terminal to couple to the at least one third terminal such that power is coupled between the first power source and the display when the first and second bodies are in at least one of the open and closed configurations and configuring the at least one first terminal and the at least one second terminal to be decoupled from the at least one third terminal when the apparatus is in the at least one intermediate configuration.

15. An apparatus, comprising:
a first body comprising a first power source, and a second body comprising a second power source and a display,
at least one processor; and
at least one memory including computer program code,
the at least one memory and the computer program code configured to, with the at least one processor, cause the apparatus to perform at least the following:
detect the configuration of the apparatus;
switch a the display between at least one of a the first and second power sources such that when the apparatus is in at least one of an open and a closed configuration, the first power source is configured to power the display, and when the apparatus is in at least one intermediate configuration the second power source is configured to power the display based on the detected configuration of the apparatus, and wherein the apparatus further comprises at least one first terminal and at least one second terminal and the first body comprises at least one third terminal, wherein when the apparatus is in at least one of the open and closed configurations at least one of the at least one first terminal and the at least one second terminal are configured to couple to the at least one third terminal such that power is coupled between the first power source and the display, and when the apparatus is in the at least one intermediate configuration the at least one first terminal and the at least one second terminal are configured to be decoupled from the at least one third terminal.

* * * * *